July 8, 1969
J. R. STRADER
3,453,962
AUTOMATIC PUMP CONTROL SYSTEM
Filed Aug. 31, 1966
Sheet 1 of 2
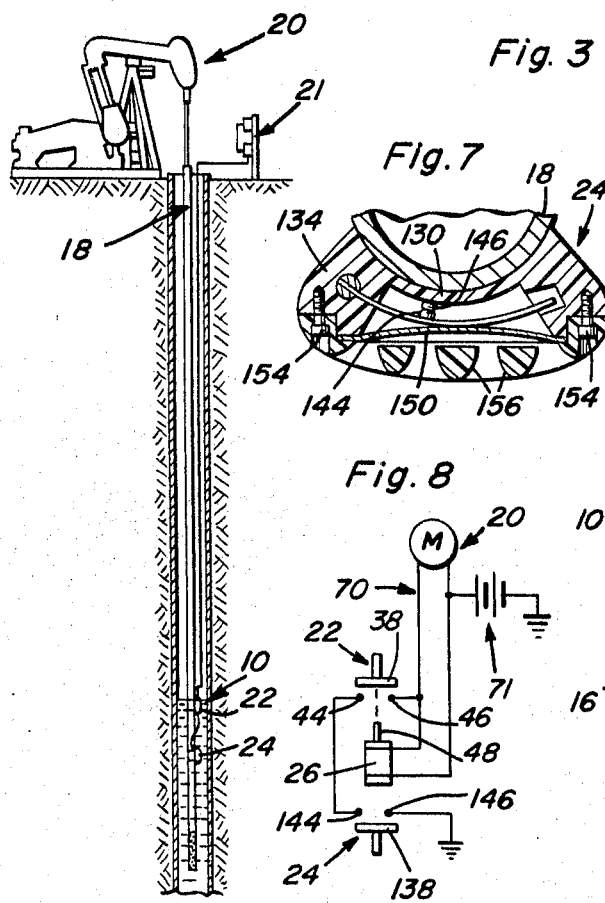
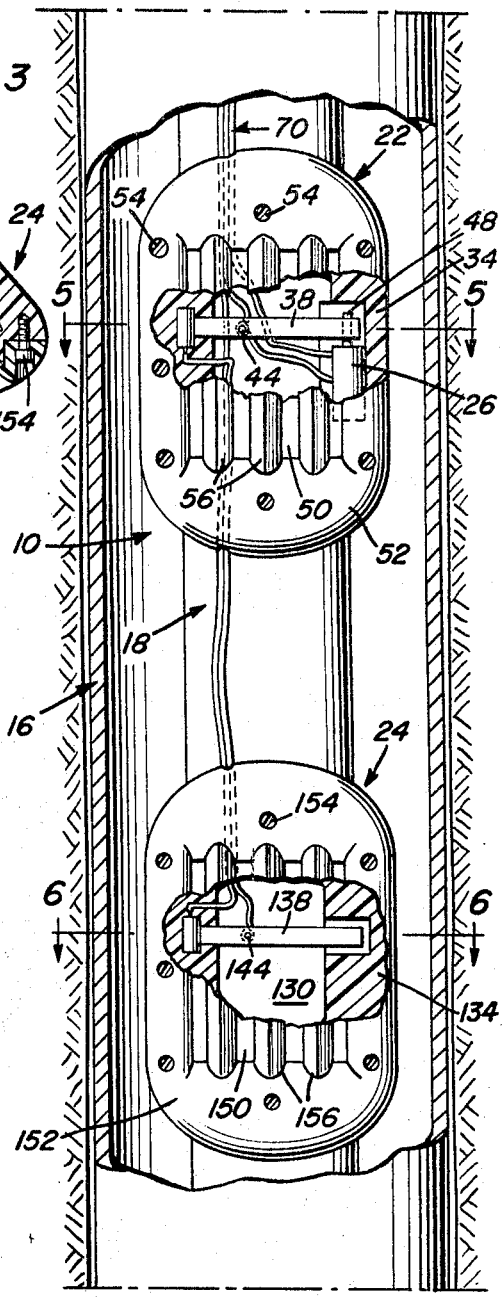
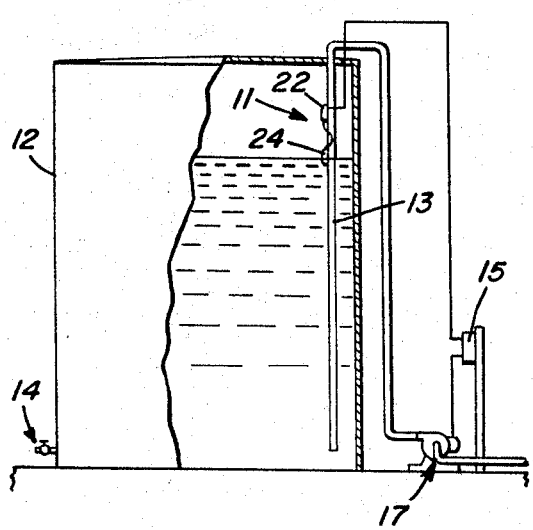
James R. Strader
INVENTOR.
BY Clarence A. O'Brien
and Harvey B. Jackson
Attorneys July 8, 1969
J. R. STRADER
3,453,962
AUTOMATIC PUMP CONTROL SYSTEM
Filed Aug. 31, 1966
Sheet 2 of 2
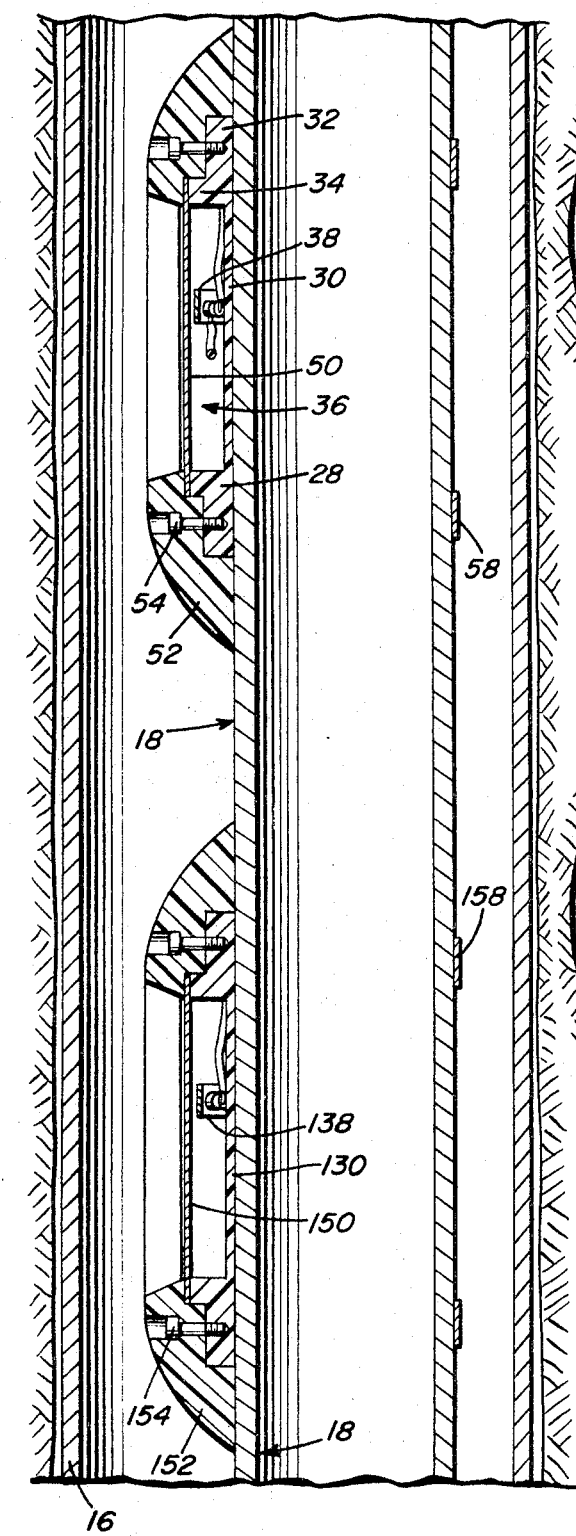
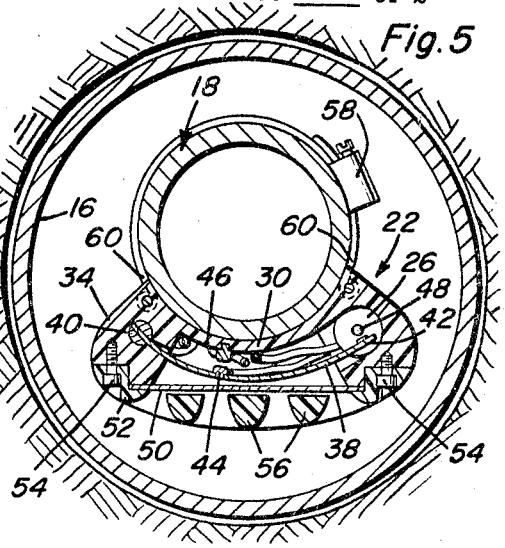
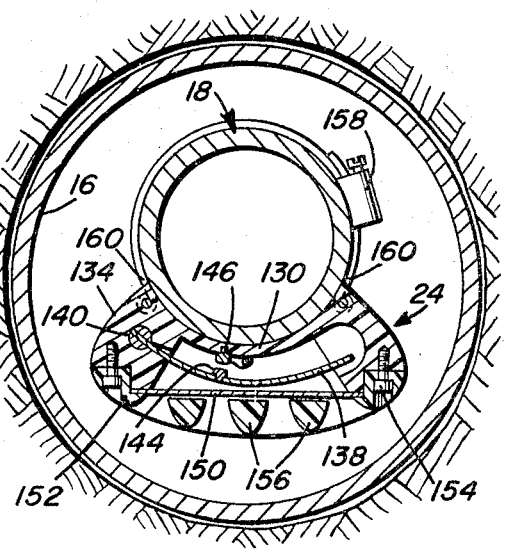
James R. Strader
INVENTOR.
BY Clarence A. O'Brien
and Harvey B. Jacobson
Attorneys

United States Patent Office 3,453,962
Patented July 8, 1969

3,453,962
AUTOMATIC PUMP CONTROL SYSTEM
James R. Strader, Fort Wayne, Ind., assignor to Industrial Inventions Incorporated, a corporation of Indiana
Filed Aug. 31, 1966, Ser. No. 576,391
Int. Cl. F04b *49/06*
U.S. Cl. 103—25                                                 3 Claims

ABSTRACT OF THE DISCLOSURE

A pump motor control system for controlling the level of liquid in a well, storage tank, etc., and including a pair of pressure responsive switch means mounted adjacent both the maximum and minimum liquid level desired for energizing and deenergizing the pump motor in response to the pressure head of liquid acting thereagainst. One of the two switch means, normally the means adjacent the maximum liquid level, is provided with an electromagnetic means, maintained energized by the other pressure responsive switch means, mounted adjacent the minimum liquid level, to maintain the switch contacts of the uppermost switch closed for a period of time in the absence of liquid pressure after the switch contacts have been closed by the pressure of liquid thereagainst whereby the contacts of the uppermost switch means are maintained closed as long as liquid pressure sufficient to close the contacts of the lowermost switch means is acting thereagainst thereby permitting a pump so controlled to maintain a liquid level differential as established by the positioning of the pair of pressure responsive switch means.

---

This invention relates to a motor control system and more particularly to an automatic pump motor control system for controlling the level of a fluid in a well, storage tank, etc. More specifically, the present invention relates to pressure responsive switch means adapted to maintain a fluid level differential within a reservoir to be filled or emptied.

Numerous motor control systems and pressure responsive switching devices have been proposed heretofore in an attempt to provide a simple, efficient, reliable means of operating a pump to assist in controlling the level of a fluid, specifically a liquid, in a well. Pressure responsive switching means have also been proposed heretofore to control a pump to maintain the level of a liquid in a well or a storage tank, for example, between a maximum and a minimum level as required, for example, when pumping an oil well with a specific quota of barrels of oil per day which may be removed from the well. However, many such devices proposed heretofore are unduly complicated, expensive and cumbersome and are oftentimes somewhat unreliable inasmuch as they require very fine adjustment and calibration to insure their efficient operation over prolonged periods under adverse conditions.

A need therefore still exists for an automatic pump motor control system to automatically control the level of liquid within a well, storage tank or the like in response to the pressure exerted as a result of the level of the liquid within the chamber in question.

Another object of the present invention is to provide an automatic pump motor control system that permits a well, to fill to a desired height with a liquid under the influence of pressure from the liquid bearing strata after which the control system actuates a pump motor to pump liquid from the well until such time as the liquid therein reaches a desired minimum or lower level at which time the pump control system turns the pump off. The pump remains off until such time as the liquid level again reaches the maximum level desired.

A further object of the present invention is to provide a motor control system for controlling the level of a fluid in a reservoir wherein the system includes a plurality of pressure responsive switch means including pressure responsive switches mounted adjacent both the maximum and minimum liquid level desired wherein the pressure responsive switches cooperate to maintain the desired liquid level differential.

Still another object of the present invention is to provide an automatic pump motor control system including pressure actuated switch means adapted to maintain a desired level of liquid within a storage tank and the like wherein the control system is adapted to operate a supply pump to fill a tank to a desired level after which the pump shuts down until such time as the liquid level within the tank drops to a minimum level differential at which time the supply pump motor is energized to refill the tank to the desired maximum liquid level.

Still a further object of the present invention is to provide an automatic pump motor control system which is adapted to operate under low as well as high static pressure conditions and temperature extremes without requiring an unusual amount of adjustment or maintenance.

Still a further object of the present invention is to provide an automatic pump motor control system which is preferably mounted upon an eduction or filling conduit within a reservoir to be emptied or filled.

Still a further object of the present invention is to provide a simple efficient, automatic pump motor control system which may be economically produced.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a diagrammatic representation of the automatic pump motor control system of the present invention as utilized in conjunction with a walking beam well pump;

FIGURE 2 is a diagrammatic representation of the automatic pump motor control system of the present invention as utilized in conjunction with a storage vessel;

FIGURE 3 is an enlarged front elevational view of a portion of the automatic pump motor control system of the present invention shown operatively positioned on an eduction tube within the casing of a well, certain portions being broken away to show interior details;

FIGURE 4 is an enlarged cross-sectional view of a portion of the automatic pump motor control system of the present invention showing certain details of the pressure responsive switch means of the control system;

FIGURE 5 is an enlarged horizontal cross-sectional view of one of the pressure responsive switch means of the control system of the present invention taken substantially along the plane of the line 5—5 of FIGURE 3;

FIGURE 6 is an enlarged horizontal cross-sectional view of another pressure responsive switch means of the control system of the present invention taken substantially along the plane of the line 6—6 of FIGURE 3;

FIGURE 7 is a fragmentary cross-sectional view of the pressure responsive switch means of FIGURE 6 further showing the switch contact in closed position in response to an actuating pressure; and FIGURE 8 is a schematic diagram of an exemplary electrical circuit for the automatic pump motor control system of the present invention.

Referring now to the drawings, as seen in FIGURES 1 and 2 the automatic pump motor control system indicated generally at 10 may be selectively utilized, for example, to intermittently pump a predetermined volume of liquid from an oil well, as seen in FIGURE 1, or as shown in FIGURE 2 the automatic pump control system 11 may be used in conjunction with a storage tank 12 to maintain an appropriate level of liquid therein so as to, for example, assure a relatively constant pressure head at an outlet conduit 14 of the storage tank 12.

As seen best in FIGURES 3 and 4 the exemplary embodiment 10 of the automatic pump control system of the present invention is shown operatively associated with a well having a casing 16, a production string 18 and a walking beam pumping apparatus indicated diagrammatically at 20. For purposes of illustration only, it will be understood that the automatic pump control system 10 embodied in FIGURES 1 and 3–8 is primarily intended to be utilized in conjunction with an oil well or the like wherein production quotas or other operating conditions are such that it is desirable or necessary to pump the well intermittently and then only remove a certain volume of liquid for each pumping cycle, such as when it is considered necessary to maintain a certain static pressure above a producing zone of maintaining a column of liquid in the well. The automatic pump control system 10 includes a pressure responsive switch means comprising a plurality of pressure responsive switches 22 and 24 respectively. As will become apparent hereinafter the pressure responsive switches 22 and 24 are substantially identical with the exception that the uppermost switch 22 is provided with an electromagnetic coil 26 which as will become apparent hereinafter comprises a switch contact holding means.

The switch 22 includes a switch housing 28 having a base portion 30 including a peripheral flange portion 32 and an upstanding peripheral wall 34 which define a switch contact means receiving recess indicated generally at 36. The switch 22 further includes a resilient electrically conductive contact carrying leaf 38 having one end 40 fixed to the peripheral wall 34 such as by molding therewith, for example, and a free end 42 projecting into the recess 36. Intermediate its ends the member 38 is provided with a switch contact 44 directly opposed to a complementary switch contact 46 carried by the base portion 30 of the switch housing 28. As seen best in FIGURES 3 and 5 the free end 42 of the resilient element 38, which of course will be of magnetic nature such as a ferrous metal for example, is adjacent the electromagnetic holding means 26 and more specifically the electromagnetic element 48 thereof. The switch housing 28 is hermetically sealed by a resilient diaphragm 50 adapted to bear against the leaf 38 which diaphragm is formed of an impervious resilient material such as neoprene, for example, or a relatively flexible metal or metallic alloy such as copper. The diaphragm 50 is clampingly secured in the normal position, as seen in FIGURE 5, by a foraminous cover and diaphragm clamping ring 52 removably secured to the base portion 30 of the switch housing 28 by means of a plurality of threadably received cap screws such as at 54. In the embodiment illustrated the clamping ring 52 is characterized by a plurality of integral, vertically extending grating bars 56. It will be understood of course that any relatively foraminous ring which sealingly clamps the diaphragm 50 in the operative position illustrated while permitting substantially free access for actuating pressure to reach the diaphragm 50 will be sufficient for the purposes of the present invention.

The base portion 30 of the switch 28 is preferably, although not necessarily concave as seen from the outer side of the housing so as to facilitate securing the switch means 22 and 24 to a producing string 18 by means of a band clamp or the like indicated generally at 58, the ends 60 of which are preferably integral with the switch housing, although it will be understood that the clamp could pass completely around the switch. As seen best in FIGURE 4, the edge of the diaphragm clamping ring 52 is preferably characterized by a generally convex configuration so as to facilitate placement of the producing string, with the switch secured thereto, within a well casing or the like. The convex configuration thereof will assist in camming the switch over an obstruction.

As indicated heretofore, the switch means 24 is substantially analogous to the switch means 22 with the above noted exception that it does not include an electromagnetic holding relay 26. Accordingly, it is not considered necessary to completely re-describe this switch other than to indicate that elements of the switch 24 analogous to those of the switch 22 have been provided with reference numerals including a prefix of 1 to the reference numeral utilized in conjunction with the analogous element of the switch 22.

Referring now to FIGURES 3 and 8 it will be understood that the switch means 22 and 24 are operatively connected to a pump motor or the like to be automatically cycled by means of suitable electrical conductors indicated generally at 70 which as seen in FIGURE 8 are operatively connected to a motor such as that of a walking beam pump unit 20 as well as a suitable source of electrical current indicated at 71. As will be apparent from FIGURE 8, as well as FIGURE 3, when the pressure exerted by the level of a liquid acts upon the diaphragm 150 the switch means 24 and the resilient contact carrying bar 138 will move to the position shown in FIGURE 7 wherein contacts 144 and 146 are in conductive relationship. However, as apparent from FIGURE 8 the motor will not be energized until such time as the diaphragm 50 of the switch 22 is subjected to sufficient pressure to force the resilient contact bar 38 inwardly thus bringing contacts 44 and 46 into conductive relation at which time the circuit will be completed from ground to the motor to source 71. Simultaneously the closing of the contacts 44 and 46 energize a series circuit so as to energize the electromagnetic holding means 26 whereby the electromagnetic element 48 attracts the free end of the resilient contact carrying bar 38 and magnetically holds it thereto to maintain the switch contacts 44 and 46 in conductive relationship. Furthermore, it will be appreciated that the holding means 26 will remain energized after the pressure acting upon the diaphragm 50 decreases, such as would otherwise allow the contact carrying bar 38 to move outwardly and permit the contacts 44 and 46 to separate, as long as of course, the pressure on the diaphragm 150 of the switch 24 is still sufficient to maintain the contact carrying bar 138 in the position shown in FIGURE 7 whereby the contacts 144 and 146 are in conductive relationship. However, when the pressure acting upon the diaphragm 150 decreases sufficiently to permit the contact carrying bar 138 to return toward its normal position whereby the contacts 144 and 146 separate the circuit to the motor and the electromagnet 26 will be simultaneously opened due to the deenergization of the electromagnet 26 and the motor will stop.

It will therefore be seen that in operation as seen in FIGURE 1 when the level of the liquid in the well rises above the level of the switch 24 the contact bar 138 will move into the position in FIGURE 7 closing contacts 144 and 146. However, the pump motor will not start. At such time as the liquid level rises so as to exert sufficient pressure on the diaphragm 50 of the switch 22 to move the contact bar 38 to the position where the contacts 44 and 46 come into conductive relationship both the motor and the holding means 26 will be simultaneously energized.

Conversely as the liquid level drops from the maximum level desired, which corresponds essentially to the position of the upper switch 22, by action of the pump withdrawing liquid through the eduction tube 18. However, due to the action of the holding means 26 the contacts 44 and 46 will remain closed and thus the motor circuit will remain energized until such time as the liquid level drops below the level corresponding to the position of the lower limit switch 24 whereby the diaphragm 150 returns to the normal position shown in FIGURE 6 thus allowing the contacts 144 and 146 to separate and open the circuit to the holding means 26. It will be understood of course that the automatic pump control system 10 is preferably operated as a relay circuit at a relatively low voltage wherein the electrical connectors 70 are connected in a suitable manner, not shown through a conventional electromagnetic relay switch such as at 21 to effect an energization of the motor from line current.

Referring now to FIGURE 2 the automatic pump control system of the present invention is shown operatively associated with a storage vessel 12 and particularly the inlet tube 13 thereof. It will be appreciated that the switch means 22 and 24 may be utilized to selectively control the level of liquid in the storage vessel 12 between a differential determined by the relative position of the switches 22 and 24 respectively. Toward this end, the switches 22 and 24 would be operatively connected to a conventional relay switch such as indicated at 15 wherein closing of the respective contacts 44, 46, 144 and 146 in the manner set forth hereinabove would cause the pump motor to be deenergized. It will thus be seen that the switches 22 and 24 when utilized as illustrated in FIGURE 2 will be operating in an inverse manner relative to that illustrated with regard to the utilization of the system in conjunction with the pumping of a well for example.

Thus it will be appreciated that when the liquid level in the tank 12 drops below the level of the switch 24 the contacts will open thus breaking the circuit to the conventional relay switch 15, so as to permit movement of appropriate electrical contacts therein to energize the pump 17. In other words, assuming that the liquid level in the tank 12 is exerting sufficient pressure on the diaphragm 50 of the upper switch 22 to close the contacts 44 and 46 and energize the holding means 26 the circuit will be completed to the relay switch 15 whereby the relay switch 15 will function to shut down the pump. Accordingly, as liquid is withdrawn the level will begin to drop in the tank. However, the pump will not be energized immediately due to the fact that the holding means 26 is still energized through the series circuit maintained through the circuit established by the closed contacts of the lower switch 24. Therefore, as soon as the liquid level drops below that necessary to exert sufficient pressure on the diaphragm 150 of the lower switch 24 to maintain the contacts 144 and 146 in conductive relationship the circuit to the holding means 26 will be disrupted as indicated heretofore. This will permit the motor energizing contacts within the relay switch 15 to come into contact and start the pump for another cycle as described hereinabove.

From the foregoing, it will be appreciated that the automatic pump control system of the present invention may be utilized for numerous pumping or other motor control situations wherein the operation of a motor may be controlled by means of the pressure exerted by a liquid level differential.

The foregoing is considered as illustrative only of the principles of the invention. Further, since numerous modifications and changes will readily occur to those skilled in the art, it is not desired to limit the invention to the exact construction and operation shown and described.

What is claimed as new is as follows:

1. In combination with a pumping system including an electrically operated motor driven pump means adapted to pump liquid in and out of a reservoir for liquid, an automatic pump motor control system for controlling the level of a fluid in the reservoir comprising first and second liquid pressure responsive switch means adapted to be actuated in response to liquid pressure acting thereagainst, means mounting said switch means within said reservoir, said first switch means being mounted at a position adjacent the maximum fluid level desired, said second switch means being mounted at a position adjacent the minimum fluid level desired, each of said switch means including normally open pressure responsive electrical contact means, electrical conductor means operatively connecting said switch means in series to the pump motor to be controlled and to a suitable source of current, said first switch means further including electromagnetic holding means electrically connected in series with the switch contact means of said first switch means and mechanically connected to the contact means of said first switch means for maintaining the same closed in the absence of actuating pressure subsequent to being closed by pressure exerted by the liquid in the reservoir as long as the switch contact means of said second switch means is closed under the influence of liquid pressure, whereby the pump motor may be automatically controlled to maintain a liquid level differential generally corresponding to the relative positions of said first and said second liquid pressure responsive switch means.

2. In combination with a pumping system including an electrically operated motor driven pump means adapted to pump liquid in and out of a reservoir for liquid, an automatic pump motor control system for controlling the level of a fluid in the reservoir comprising first and second liquid pressure responsive switch means adapted to be actuated in response to liquid pressure acting thereagainst, means mounting said switch means within said reservoir, said first switch means being mounted at a position adjacent the maximum fluid level desired, said second switch means being mounted at a position adjacent the minimum fluid level desired, each of said switch means including normally open pressure responsive electrical contact means, electrical conductor means operatively connecting said switch means in series to the pump motor to be controlled and to a suitable source of current, said first switch means further including electromagnetic holding means electrically connected in series with the switch contact means of said first switch means and mechanically connected to contact means of said first switch means for maintaining the same closed in the absence of actuating pressure subsequent to being closed by pressure exerted by the liquid in the reservoir as long as the switch contact means of said switch means is closed under the influence of liquid pressure, whereby the pump motor may be automatically controlled to maintain a liquid level differential generally corresponding to the relative positions of said first and said second liquid pressure responsive switch means, said first and second liquid pressure responsive switch means each comprising a switch housing including a base portion, said base portion including an upstanding peripheral wall defining a switch contact means receiving recess, a normally open switch contact means operatively mounted within said recess, a diaphragm means in overlying relationship to said recess, said diaphragm being adapted to close said switch contact means under the influence of pressure, and a foraminous cover means adapted to secure said diaphragm to said base portion whereby said switch contact means receiving recess is hermetically sealed.

3. The combination of claim 2 wherein said switch contact means of said first switch means includes an elongated resilient contact carrying member having one end rigidly secured to said base portion and said electromagnetic means when energized attracting the free end of said contact carrying member to maintain said switch contact means of said first switch means closed.

References Cited

UNITED STATES PATENTS

| | | | | |
|---|---|---|---|---|
| 2,251,180 | 7/1941 | Wesley et al. | | |
| 2,337,195 | 12/1943 | Hobbs | 200—83.8 | |
| 2,756,301 | 7/1956 | Sutton | 200—83.8 | |
| 2,922,002 | 1/1960 | Gilman | 200—83.6 | |
| 2,757,295 | 7/1956 | Briggs | 200—83.4 XR | |
| 3,132,331 | 5/1964 | Boddy | 200—83 XR | |
| 3,132,592 | 5/1964 | Rudy et al. | 200—83 XR | |
| 1,913,557 | 6/1933 | Millar | 103—25 | |
| 2,251,180 | 7/1941 | Wesley et al. | 200—83.8 | |
| 3,015,417 | 1/1962 | Daley | 103—25 | |
| 3,070,021 | 12/1962 | Tutthill | 103—25 | |
| 3,154,652 | 10/1964 | Gilman | 103—25 | |
| 3,292,547 | 12/1966 | Ward | 103—11 | |

WILLIAM L. FREEH, *Primary Examiner.*

U.S. Cl. X.R.

200—83